June 8, 1937. W. H. FARR 2,083,325
VEHICLE WHEEL
Filed Jan. 23, 1934
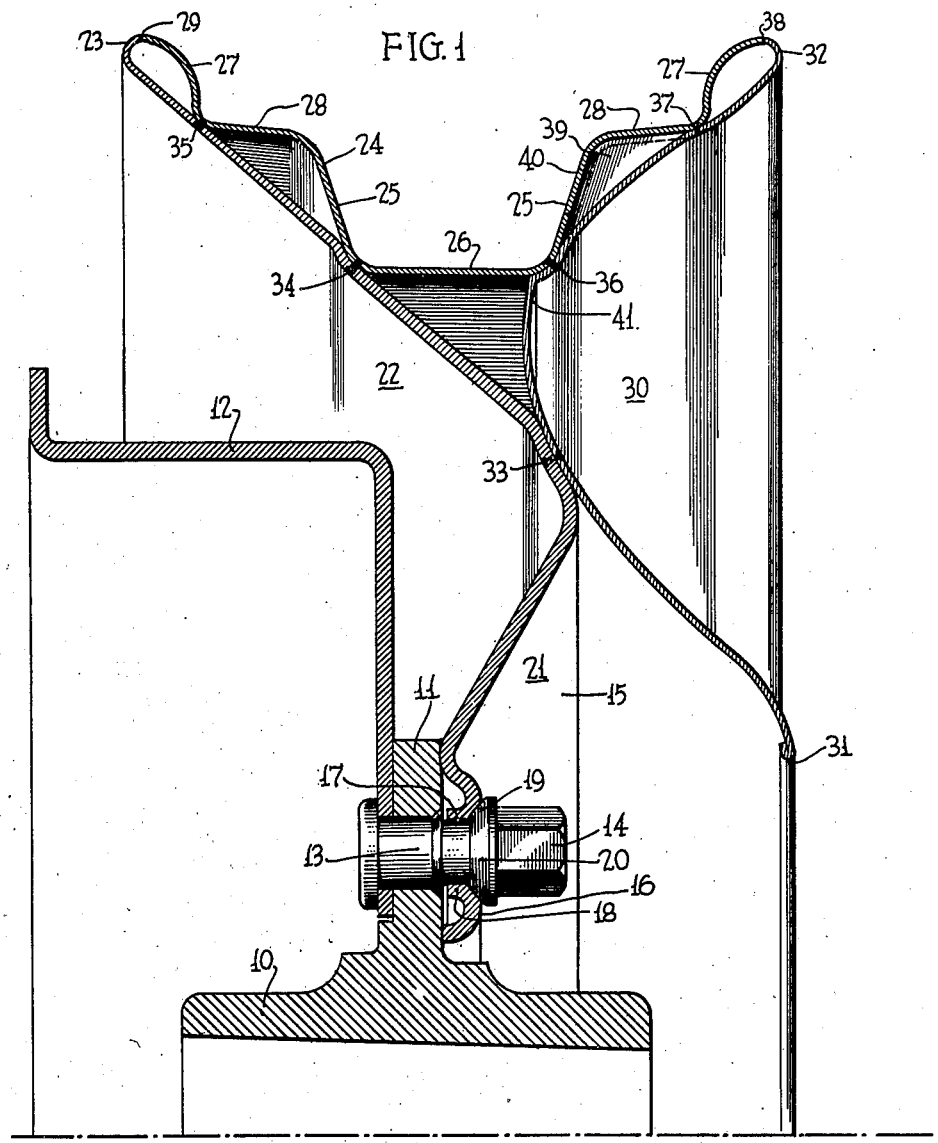
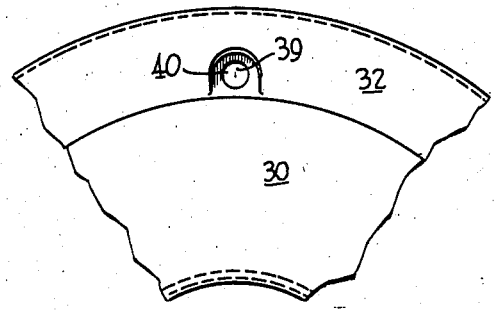
INVENTOR.
WARREN H. FARR.
BY
ATTORNEY.

Patented June 8, 1937

2,083,325

UNITED STATES PATENT OFFICE 2,083,325

VEHICLE WHEEL

Warren H. Farr, Detroit, Mich., assignor to Budd Wheel Company, Philadelphia, Pa., a corporation of Pennsylvania Application January 23, 1934, Serial No. 707,875

2 Claims. (Cl. 301—63)

My invention relates to vehicle wheels, and more particularly to wheels of very light weight construction, having the requisite strength and outwardly desirable appearance.

In present day high speed motor vehicle operation, centrifugal forces become a controlling factor in wheel design. Great strength and minimum weight are desirable. The fabrication of a wheel attaining largely a desirable combination of these factors comprises one of the major objects of my invention. Some of the other objects of my invention include the formation of a wheel from a small number of parts requiring simple methods and means of fabrication, and also the formation of a hollow strongly arched rim and body combination and the formation of the rim and body with complemental cooperating portions.

I attain these objects by constructing a wheel in few parts with a proper proportioning of bulk, as well as, an avoidance of detrimental factors.

This invention will be better understood by reading of the sub-joined specification and claims in connection with the drawing hereto attached.

Figure 1 is an axial section through one form of wheel made according to my invention.

Figure 2 is a partial elevational view.

In Figure 1 I have shown by a sectional view of the upper half of a wheel assembly, one form of my invention. It is obvious that the generic spirit of my invention is not to be limited to the form shown but also includes various modifications and changes which fall within the scope of the appended claims.

The hub member 10 having a suitable flange 11 has secured thereto a brake drum 12 of pressed metal or other form, by means of a plurality of studs 13 which secure the brake drum head portion and the hub flange portion together. The studs extend axially, and have secured thereon cap nuts 14 utilized in the retention of the wheel body to the hub flange. The construction just described may be varied according to conditions and is not a part of the present invention.

The wheel in the form shown is of the demountable bolting-on type, having a drop center form of rim portion construction, the outboard contour of the wheel being provided by means of a light weight member comprising an essential part of the construction, but being subject to modification as to contour.

The main load carrying element of the wheel comprises preferably a tapered disc member 15, which member has adjacent its radially inner periphery, a mounting portion commonly called the bolt hole circle 16. This circle is substantially a radially extending flange portion of shallow channel section having annularly spaced about this portion a plurality of bolt holes 17, having inturned edge portions 18 providing substantially angular seats 19 for cooperation with angularly extending portions 20, on the cap nuts 14. This construction centrally of the wheel body provides a resilient mounting which is in the nature of a lock nut in its ability to retain the assembly in close cooperation.

The member 15 extends radially outwardly from the bolting-on flange portion, extending generally angularly outwardly in an outboard direction while being of tapering thickness therethrough. This angularly extending portion 21 is substantially frustro-conical in shape. This portion of the wheel extends into an oppositely angularly extending portion of continued tapered thickness 22 which latter portion extends radially outwardly to the point 23 where it changes direction and becomes a part of the rim.

The wheel body includes an additional member 24, which comprises the major part of the drop center rim. This member, as shown, is of a substantially uniform thickness and of light gauge throughout. This naturally is not a limiting description, but is one example of a construction which is utilizable. The member 24 has a drop center portion, having side walls 25 and base portion 26, tire bead retaining portions 27 and tire bead seating portions 28. The retaining side wall portions 27 extending radially and axially to a point forming an angularly coextensive engaging portion with the load carrying member 15 at point 29.

The wheel body is completed by means of an outer member 30, having functions of strength, structural cooperation with the other parts and provision of the outward appearance of the wheel body. This member 30 is of substantially channel section terminating radially in peripheral portions, one of which provides a hub cap securing part 31, the other of which 32, is arranged for cooperative angularly coextensive engagement with the periphery of the part 27 of the rim member. The rim and load carrying members may be integrally secured by means of spot, spud, seam or line welds 34 and 35, or in some other manner in these areas, such as by rivets, for example. A further point of joinder of these two members at the angularly substantially continuous areas 29 may be by flash welds, arc welds, butt welds or in some other manner. This construction provides a main strength member in the form of tapered disc extending sharply axially inwardly and radially outwardly and supporting on its outer angular surface, the inner surface of a light weight sheet metal drop center rim. It is secured thereto preferably by welding at its peripheral edge 29, and also at its angularly inner corners 34, 35. The wheel body is further completed by the securement of the outer contouring member 30 by means of spud, spot, seam, line welding or other means at 33 to the load member, at 36 and 37 to light weight rim, and at 38 a similar joint to that at 29 is preferable.

What I claim is:

1. A vehicle wheel comprising a tapered disc member, having a substantially radially extending bolting-on flange, a tapered disc portion extending radially outwardly thereof including a sharply angularly outwardly extending portion, and therebeyond a sharply angularly inwardly extending portion, said last named portion terminating radially in a zone adjacent to a light gauge sheet metal rim member and secured thereto, said rim member being of substantially uniform thickness and having drop center contour, and a substantially uniform thickness light gauge sheet metal member substantially channel shaped in section providing at one periphery a hub cap securing portion axially spaced from and radially outwardly of the bolting-on flange, said member bridging the angle between the axially outer drop center side wall and the adjacent bead seat and secured to each the side wall and the bead seat, and secured inwardly of the drop center portion to the axially outwardly extending portion of the tapered disc member.

2. A sheet metal wheel comprising a tapered disc wheel body having radially inner and outer conical portions of opposite conicity, a uniform thickness sheet metal drop center rim member, peripheral portions of said parts being integrally united, and said rim member being secured through the apices of the angles between its axially inner drop center side wall and bottom wall and bead seat and retaining flange to the said radially outer conical portion of the disc member, and an axially outer member secured at its radially outer periphery to said rim member and to the inner zone of the outer conical portion of the disc member.

WARREN H. FARR.